(12) United States Patent
Jones

(10) Patent No.: US 6,631,118 B1
(45) Date of Patent: Oct. 7, 2003

(54) SYSTEM AND METHOD FOR PROVIDING DYNAMIC BANDWIDTH ON DEMAND

(75) Inventor: Michael B. Jones, Florham Park, NJ (US)

(73) Assignee: AT&T Corp., New York, NY (US)

( * ) Notice: Subject to any disclaimer, the term of this patent is extended or adjusted under 35 U.S.C. 154(b) by 0 days.

(21) Appl. No.: 09/189,201

(22) Filed: Nov. 10, 1998

(51) Int. Cl.[7] ............................... H04J 3/14; H04J 3/16
(52) U.S. Cl. ........................................ 370/252; 370/468
(58) Field of Search ................................ 370/229, 230, 370/231, 232, 233, 234, 235, 236, 252, 253, 468, 477

(56) References Cited

U.S. PATENT DOCUMENTS

| | | | |
|---|---|---|---|
| 5,058,133 A | | 10/1991 | Duncanson et al. |
| 5,231,649 A | | 7/1993 | Duncanson |
| 5,488,609 A | * | 1/1996 | Hluchyj et al. ............. 370/232 |
| 5,559,798 A | | 9/1996 | Clarkson et al. |
| 5,748,901 A | * | 5/1998 | Akek et al. ............. 395/200.68 |
| 5,938,731 A | * | 8/1999 | Schreiter ..................... 709/227 |
| 6,021,120 A | * | 2/2000 | Beyda et al. ............... 370/282 |
| 6,097,722 A | * | 8/2000 | Graham et al. ........ 370/395.21 |
| 6,128,280 A | * | 10/2000 | Jamoussi et al. ........... 370/230 |
| 6,263,016 B1 | * | 7/2001 | Bellenger et al. ........... 375/222 |
| 6,282,206 B1 | * | 8/2001 | Hindus et al. .............. 370/468 |
| 6,292,476 B1 | * | 9/2001 | Zehavi et al. ............... 370/335 |
| 6,292,551 B1 | * | 9/2001 | Entman et al. ............. 379/221 |
| 6,343,085 B1 | * | 1/2002 | Krishnan et al. ............ 370/468 |
| 6,345,038 B1 | * | 2/2002 | Selinger ..................... 370/230 |
| 6,421,345 B1 | * | 7/2002 | Enoki et al. ........... 370/395.21 |

\* cited by examiner

*Primary Examiner*—Min Jung

(57) ABSTRACT

A system and method to adjust dynamically network speed or bandwidth allocation. A network connection is established at some initial speed. The bandwidth usage through the connection is monitored, and when the connection speed becomes congested with data, the connection is dropped and a higher speed connection is established.

32 Claims, 2 Drawing Sheets

SYSTEM AND METHOD FOR PROVIDING DYNAMIC BANDWIDTH ON DEMAND

FIELD OF THE INVENTION

The present invention relates generally to computer networks. In particular, the present invention relates to adjusting connection speed dynamically to provide desired bandwidth.

BACKGROUND OF THE INVENTION

The ability to request bandwidth on demand cost effectively has been an area of study for several years. Services like ATM (asynchronous-transfer-mode) SVC (switch-virtual-circuit) allow customers to buy bandwidth at fixed bandwidth increments. With these services, users can purchase the ability to transmit and receive at some maximum bandwidth, and users are allowed to burst (i.e., temporarily increase transmission and/or reception rates) to the maximum port speed they purchase. The performance at burst rate, however, is not guaranteed because the network is allowed to discard cells above the purchased sustained rate under conditions of high network load. This is a harmful drawback because in many applications, service suppliers need to guarantee service performance. For example, a service supplier may, for a certain application, require a 5 second response time but be unable to guarantee that level of performance.

The challenge of providing guaranteed response time is particularly difficult with applications that send and/or receive images because the requirements for bandwidth can vary in these applications from as low as 64 kilobits per second ("kbps") to as high as 155 million bits per second ("mbps") within the same imaging application. Table 1 shows typical uncompressed and compressed image sizes and image display times with a 56 kbps transport pipe (i.e., 56 kbps channel bandwidth). Response times can vary dramatically depending upon the size of the image.

TABLE 1

| Example (time @ 56 kbps) | Image Dimension | Uncompressed Size | Compressed Size (JPEG) | Response Time |
|---|---|---|---|---|
| Typical image 640 × 480 screen | 400 × 300 × 16 | 240 kbytes | 24 kbytes | 3.5 sec |
| Full page color image | 2400 × 3150 ×16 | 15 Mbytes | 1.5 Mbytes | 3.5 min |
| High resolution photograph | 10 K × 10 K × 16 | 200 Mbytes | 20 Mbytes | 48 min |

Various ways exist in the prior art to avoid the need for dynamic bandwidth. One of the more widely utilized ways is called Flashpix, developed by Kodak and Hewlett Packard. Flashpix is an image file format that stores images in a square-tile hierarchical file format. Imaging Internet Protocols defined by Hewlett Packard and Kodak, and widely used in the industry, allow application developers to display a defined number of the square tiles at any time in a window at any level within the hierarchy. The applications display only a fixed number of tiles which consume a fixed amount of bandwidth. If a user desires to display the entire image there is no way in the prior art to adjust the bandwidth dynamically to allow the whole image to be downloaded within a guaranteed response time.

For example, Table 2 contains a typical pricing for SVC service. Users are required to pay for a port speed, for example a 45 mbps port, and the per minutes charges shown in Table 2. For a screen image from Table 1, an end user could select a 64 kbps SVC at a variable bit rate of $0.03 per minute. The 24 kbytes screen image would download in 3.5 seconds. If during the session the user wanted to print the 1.5 Mbyte image, current ATM technology allows the application to burst up to the full port speed of 45 mbps for no additional charge. If the network is not congested, the bits will flow at 45 mbps and the 1.5 Mbyte image will be downloaded in less than 3.5 seconds. But if the network is congested, the ATM service will disregard the bits above the contracted 64 kbps SVC rate and the end-user response time is not guaranteed.

TABLE 2

| BANDWIDTH (kbps) | VARIABLE BIT RATE ($/min.) | CONSTANT BIT RATE ($/min.) |
|---|---|---|
| 64 | $0.03 | $0.05 |
| 1,024 | $0.69 | $1.15 |
| 2,048 | $0.95 | $1.61 |
| 10,240 | $10.00 | $17.00 |

Thus, for many applications, the inability to adjust bandwidth dynamically to guarantee performance is a severe disadvantage.

SUMMARY OF THE INVENTION

The present invention provides a system and method of dynamically provisioning bandwidth that will substantially guarantee response time.

In one embodiment of the present invention, a network connection is established at some initial speed. The bandwidth usage through the connection is monitored, and when the connection becomes congested with data as defined by some predetermined parameters, the connection is dropped and a higher-speed connection is established. By provisioning the bandwidth dynamically, a substantially-guaranteed response time is provided that is economically attractive.

DETAILED DESCRIPTION

The present invention relates to transferring data over a network. In particular, the present invention relates to altering dynamically network connection speed.

To place the invention in a context, although not the only context, assume a user desires a 3.5 second response time for a certain application. As Table 1 shows, using conventional techniques, the display time depends on the type of image displayed, and can be as high as 48 minutes for a 20 Mbyte compressed JPEG file. Table 3 shows the same information as Table 1 with the last column indicating the required bandwidth usage to support a 3.5 second response time for eight-bit data. To calculate the required bandwidth usage for a desired response time, the required bandwidth usage equals the compressed size times 8 bits, divided by the required response time. For example, if a 3.5 second response time is required for 24 kbyte compressed data, one would multiply 24 kbytes by 8 bits, and then divide by 3.5 seconds, giving 54 kbps as the required bandwidth usage.

TABLE 3

| Example | Compressed Size | Response Time | Bandwidth Required |
|---|---|---|---|
| Typical image 640 × 480 screen | 24 kb | 3.5 sec | 54 kbps |
| Full page color image | 1.5 mb | 3.5 sec | 3.5 mbps |
| High resolution photograph | 20 mb | 3.5 sec | 46 mbps |

Assume a user would like to use a variety of applications that require a range of bandwidth anywhere from the 24 kbytes images for screen editing to the 20 Mbytes for a high resolution photograph for high quality printing. Embodiments of the invention involve adjusting the bandwidth provided to the application to sustain the 3.5 second response time.

Figure 1:
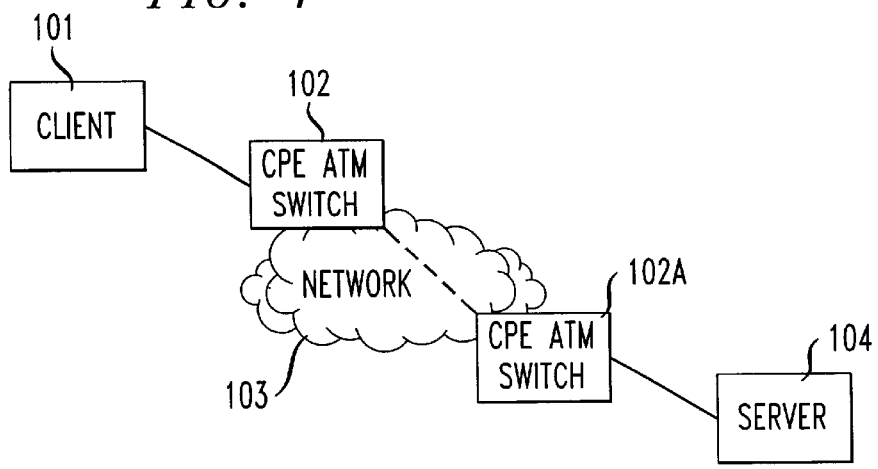
FIG. 1 is a system overview of an embodiment of the present invention.

Turning now in detail to the drawings, FIG. 1 illustrates a system overview of an embodiment of the present invention. As a context, but not the only context, for the present invention, assume a client desires to connect to a server through an ATM network. In this overview, client 101 connects to network 103 through customer-premises equipment ("CPE") ATM switch 102. Server 104 is connected to network 103 through CPE ATM switch 102a. Therefore, in this example, data flows from client 101 through CPE ATM switch 102, and into network 103. The data then leaves network 103 through CPE ATM switch 102a and into server 104. Data can flow back from server 104 through the same, albeit reversed, path.

Figure 2:
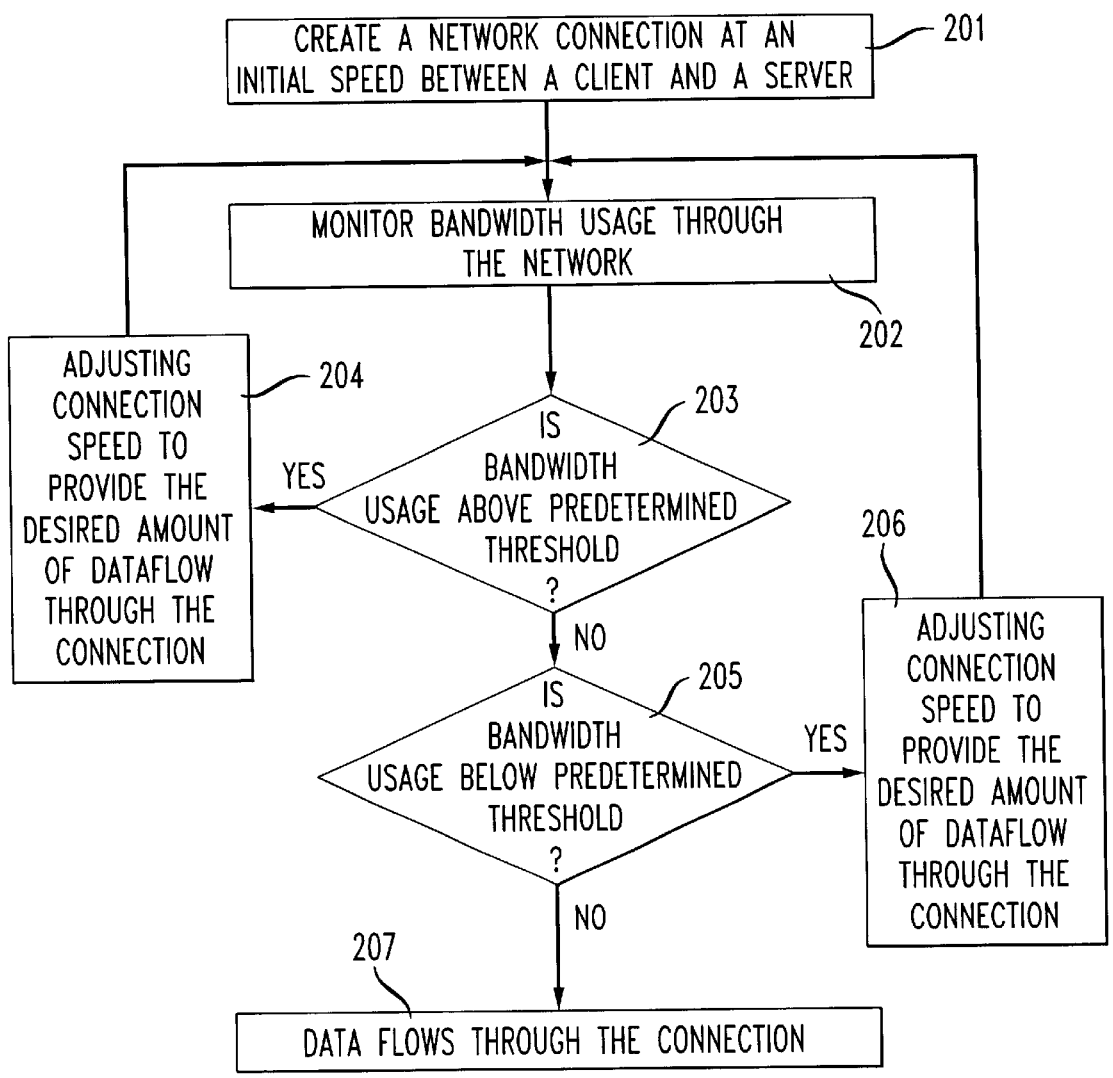
FIG. 2 is a flowchart of an embodiment of a method of practicing the present invention.

FIG. 2 is a flow chart illustrating a method of practicing the present invention. At step 201, a network connection at a predetermined initial speed between a client and a server is created. At step 202, the bandwidth usage through the connection is monitored. In one embodiment of the present invention, a monitoring module is installed at the client of an ATM network. The monitoring module can be hardware, software, or some combination of hardware and software. At step 202, the monitoring module monitors the bandwidth usage through the connection over some predetermined period of time Δt.

Monitoring step 202 can be performed in any known way. In one embodiment of the present invention, monitoring step 202 is performed by counting the packet flow through the connection over some Δt. In another embodiment of the present invention, monitoring step 202 is performed by measuring the amount of data contained in a buffer waiting for packetization.

If the bandwidth requirements, i.e., the packet-flow count or the buffer size, are determined at step 203 to be above a default usage value or predetermined threshold, then at step 204, the connection speed is adjusted to provide the desired amount of dataflow through the connection (i.e., the bandwidth usage). To do this, in one embodiment of the present invention, the monitoring module buffers the data, drops the low-bandwidth connection, and then creates a higher-bandwidth connection through which the buffered data is transmitted. Using ATM SVC as an example, when an application sets up an ATM SVC, a sustained value is indicated in the call-setup message. The call-setup message indicates to the network how much resources need be reserved for the call. In ATM, call setup and tear down can take place in under 100 milliseconds. At this speed, call setup and call tear down is so fast that transmission control protocol (TCP) internet protocol (IP) applications are not affected.

Connection speed can be represented using either the rate at which an amount of data flows through the connection, called data flow rate or bandwidth usage, or the rate at which a number of cells flows through the connection, called packet flow rate. One can convert from bandwidth usage to packet flow rate based on how much data makes up one cell. As defined herein, a packet is any discrete quantum of information, and is meant to include, but is not limited to, for example, an IP packet, a frame, etc.

As an example of a conversion calculation, ATM cells are 53 bytes long, typically containing a 5 byte header and 48 bytes of user data. If a user desires to send a 96 byte email message, the software can packetize the 96 bytes into two ATM cells. Thus, 56,000 bits per second, divided by 8 bits per byte, divided by 53 bytes per cells gives the following:

(56,000 bits/sec)/(8 bits/byte)/(53 bytes/cell)=132 cells per second.

This is the rate at which a 56 kbps connection can handle packet flow.

Thus for the 96 byte example, the packet rate is 2 cells per second, and this rate does not tax the 56 kbps line. Now, if a user desires to send a 5 Mbyte file, the following calculation is used:

(5,000,000 bytes)/(48 bytes/cell)=104,166 cells.

At 56 kbps it would take (104,166 cells)/(132 cells/second)=789 seconds. This obviously does not meet the 5 second response time. To meet the 5 second response time, the following calculation is used:

(104,166 cells)/(5 seconds)=20,833 cells/second.

(20,833 cells/second)times(53 bytes/cell)times(8 bits/byte)=8,833,192 bits/second.

Thus, one needs roughly a 9 mbps connection to provide the desired 5 second response time. When the monitoring software in this example monitors the rate of cell creation to exceed 100 cells/second as the default for the 56 kbps line, the 56 kbps connection is dropped and the 9 mbps connection is established.

At step 205, it is determined whether the bandwidth usage requirement through the connection is below the predetermined threshold. If no, the data is transferred to the server at step 207 without adjusting to a higher bandwidth connection. If yes, then at step 206, the connection speed is adjusted to provide the desired amount of dataflow through the connection. In one embodiment of the present invention, the monitoring module buffers the data that needs buffering, drops the higher-bandwidth connection, and then creates a lower-bandwidth connection through which the buffered data, or other data, is sent.

In another embodiment of the present invention, the monitoring software exists at the CPE ATM switch. In this embodiment, the monitoring at step 202 can monitor the usage of one client or a group of clients attached to the CPE ATM switch. In fact, in this embodiment, all the steps in the flow chart in FIG. 2 can occur by monitoring one client or a group of clients attached to the switch. Superior bandwidth management can be achieved by monitoring and manipulating data flow at the CPE ATM switch and by monitoring all the clients attached to the switch. For example, two clients may average a 400 kbps circuit. Their requirement for bandwidth can vary over time. By multiplexing both clients onto one SVC, a 400 kbps SVC can take advantage of the fact that both clients will likely not be transmitting simultaneously. Various known queuing algorithms can be employed to determine which clients get priority treatment. For example, a round robin queuing algorithm can be implemented that ensures each client gets equal access to the output SVC instead of one large bandwidth client dominating the SVC.

In another embodiment of the present invention, the monitoring takes place in a wide-area network. The steps in the flow chart in FIG. 2 monitors the usage from one client or a group of clients connected to the network via one CPE ATM switch or a plurality of CPE ATM switches. Relatively efficient bandwidth management can be achieved if the bandwidth usage between all the clients connected to all the switches attached to the network is monitored. For example, but not the only example, the wide-area network switch in New York can count the usage from all the connected CPE ATM switches. At step 203, the monitoring can occur for all the clients of all the switches attached to the New York wide-area switch.

In another embodiment of the present invention, the monitoring takes place at the server of an ATM network. In this embodiment, at step 201, a network connection is established at an initial speed between a client and a server. At step 202, the bandwidth usage through this connection is monitored. In one embodiment of the present invention, this monitoring step is performed by counting the packet flow through the connection over some Δt. In another embodiment of the present invention, this monitoring is performed by measuring the amount of data that is buffered for packetization.

Figure 3:
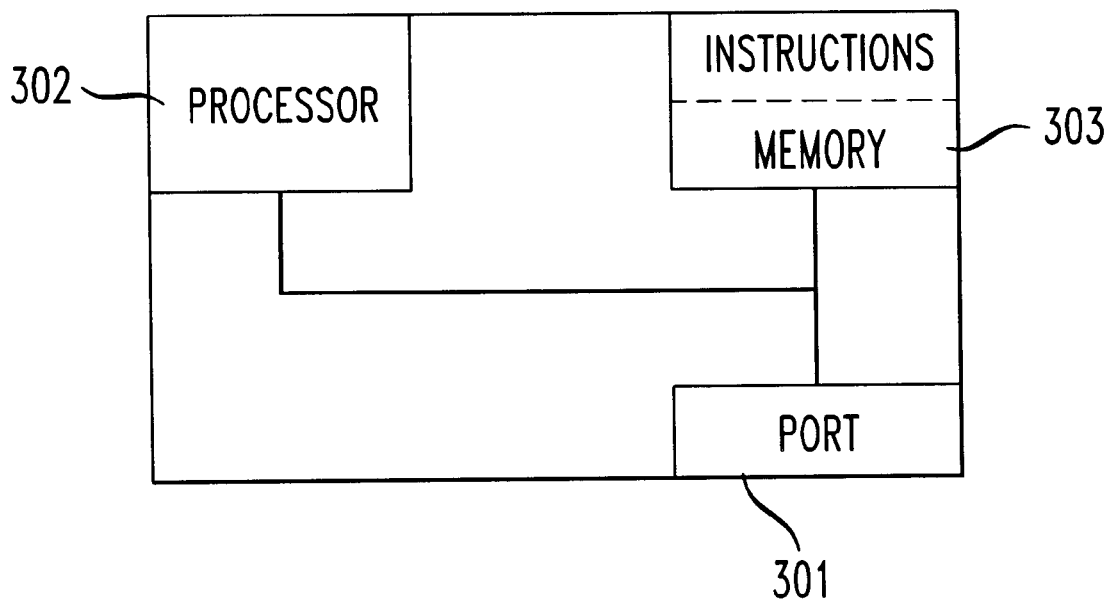
FIG. 3 is a block diagram of an embodiment of an apparatus according to the present invention.

FIG. 3 illustrates a block diagram of an apparatus according to an embodiment of the present invention. In this embodiment, port 301 is coupled to processor 302, and memory 303 is coupled to processor 302 and port 301. Port 301 is used to connect the apparatus to a network, and data packets flow through this connection.

Memory 303 stores instructions adapted to be run on processor 302 to create a network connection at an initial speed, monitor the bandwidth usage through the connection, and adjust the connection speed to provide a desired dataflow rate.

For the purposes of this document, memory includes any medium capable of storing instructions adapted to be executed by a processor. Some examples of such media include, but are not limited to, floppy disks, CDROM, RAM, cache, magnetic tape, hard drives, and any other device that can store digital information. In one embodiment, the instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

In one embodiment of the present invention, memory 303 stores instructions adapted to be run on processor 302 to monitor bandwidth usage so that if bandwidth requirements are determined to be above a default usage value or a predetermined threshold, the connection speed is adjusted to provide the desired amount of dataflow through the connection. To do this, memory 303 can store instructions adapted to be executed by processor 302 to buffer any data that needs buffering, drop the low-bandwidth connection, and then create a higher-bandwidth connection through which the buffered data, or other data, can be transmitted.

In another embodiment of the present invention, memory 303 stores further instructions to determine whether the bandwidth requirement through the connection is below a predetermined threshold. If the answer is no, data can be transmitted across the connection. Memory 303 stores instructions adapted to be executed by processor 302 so that if the answer is yes, connection speed can be adjusted to provide the desired bandwidth.

In one embodiment of the present invention, memory 303 stores further instructions adapted to be executed by processor 302 to monitor the bandwidth usage from a client, or from a group of clients.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims. For example, memory 303 can store instructions adapted to be executed by the processor to monitor the packet flow at a client to monitor the packet flow at a CPE ATM switch, or to monitor the packet flow on a wide-area network. Additionally, memory 303 can store instructions adapted to be executed by the processor to buffer the packets at various points on the network or even on the CPE ATM switch.

What is claimed is:

1. A method comprising:
   (a) causing a network to provision at least a first guaranteed amount of bandwidth to be provided by said network for transfer of data from a first user to a second user;
   (b) monitoring a bandwidth usage of the data transfer; and
   (c) in response to a change in the monitored bandwidth usage, causing said network to provision a second, different amount of guaranteed bandwidth to be provided by said network for said transfer of data from said first user to said second user, to thereby provide a desired amount of dataflow between said first and second users.

2. The method of claim 1, wherein said first user is a client and wherein the bandwidth usage is monitored at the client.

3. The method of claim 2, wherein the bandwidth usage is monitored by counting a packet flow of the data transfer during some predetermined period of time.

4. The method of claim 1, wherein (i) the first user is a client connected to the network through a CPE ATM switch, and (ii) the bandwidth usage is monitored at the CPE ATM switch.

5. The method of claim 4, wherein the bandwidth usage is monitored by counting the packet flow of said data transfer during some predetermined period of time.

6. The method of claim 1, wherein the bandwidth usage is monitored on the network.

7. The method of claim 6, wherein the bandwidth usage is monitored by counting a packet flow of said data transfer during some predetermined period of time.

8. The method of claim 6, wherein said monitoring is performed by measuring an amount of data that is buffered for packetization.

9. The method of claim 1,
   wherein said causing the network to provision at least a first guaranteed amount of bandwidth includes causing said network to establish a first network connection for said transfer of data, and
   wherein said causing said network to provision a second, different amount of guaranteed bandwidth comprises:

(i) dropping the first network connection responsive to the change in the monitored bandwidth usage of said data transfer; and (ii) automatically and substantially immediately establishing a second, higher-speed network connection for said transfer of data.

10. The method of claim 1, wherein said causing the network to provision at least a first guaranteed amount of bandwidth includes causing said network to establish a first network connection for said transfer of data, and wherein said causing said network to provision a second, different amount of guaranteed bandwidth comprises:

(i) dropping the first network connection responsive to the change in the monitored bandwidth usage of said data transfer; and (ii) automatically and substantially immediately establishing a second, lower-speed network connection for said transfer of data.

11. An apparatus for transferring data over a network, comprising:

(a) a processor;

(b) a port coupled to said processor;

(c) a memory coupled to said port and said processor, storing instructions adapted to be executed on said processor to (i) cause the network to provision at least a first guaranteed amount of bandwidth to be provided by said network for transfer of data from a first user to a second user over a network connection;

(ii) monitor a bandwidth usage through the connection;

(iii) in response to a burst in the monitored bandwidth usage, cause said network to provision a second, higher amount of guaranteed bandwidth to be provided by said network for said transfer of data from said first user to said second user, to thereby provide a desired higher amount of dataflow from said first user to said second user; and (iv) in response to an end of the burst in the monitored bandwidth usage, cause said network to provision a lower amount of guaranteed bandwidth to be provided by said network for said transfer of data from said first user to said second user.

12. The apparatus of claim 11, wherein said first user is a client and wherein the bandwidth usage through the network connection is monitored at the client.

13. The apparatus of claim 11, wherein (i) said first user is a client connected to the network through a CPE ATM switch, and (ii) the bandwidth usage through the network connection is monitored at the CPE ATM switch.

14. The apparatus of claim 11, wherein the bandwidth usage through the network connection is monitored at the network.

15. The apparatus of claim 11, wherein the bandwidth usage through the network connection is monitored at a server.

16. The apparatus of claim 11, wherein the monitoring is performed by counting an amount of data that flows through the network connection in a given time interval.

17. The apparatus of claim 11, wherein the monitoring is performed by measuring an amount of data that is buffered for packetization.

18. The apparatus of claim 11, wherein said memory stores further instructions adapted to be executed by said processor to (i) determine whether the bandwidth usage through the network connection has reached a predetermined threshold and, if it has;

(ii) drop the network connection; and (iii) automatically and substantially immediately establish a higher-speed network connection for said transfer of data.

19. The apparatus of claim 1, wherein said memory stores further instructions adapted to be executed by said processor to (i) determine whether the bandwidth usage through the network connection is below a predetermined threshold and, if it is;

(ii) drop the network connection; and (iv) automatically and substantially immediately establish a lower-speed network connection for said transfer of data.

20. A computer-readable medium that stores instructions adapted to be executed by a processor to perform the steps of:

(a) causing a network to provision at least a first guaranteed amount of bandwidth to be provided by said network for transfer of data from a first user to a second user;

(b) monitoring a bandwidth usage of the data transfer;

(c) in response to a burst in the monitored bandwidth usage, causing said network to provision a second, higher amount of guaranteed bandwidth to be provided by said network for said transfer of data from said first user to said second user to thereby provide a desired amount of dataflow from said first user to said second user; and (d) in response to an end of the burst in the monitored bandwidth usage, causing said network to provision a lower amount of guaranteed bandwidth to be provided by said network for said transfer of data from said first user to said second user.

21. The computer-readable medium of claim 20, wherein said first user is a client and wherein the bandwidth usage is monitored at the client.

22. The computer-readable medium of claim 20, wherein (i) said first user is a client connected to the network through a CPE ATM switch, and (ii) the bandwidth usage is monitored at the CPE ATM switch.

23. The computer-readable medium of claim 20, wherein the bandwidth usage is monitored at the network.

24. The computer-readable medium of claim 20, wherein said monitoring is performed by counting an amount of data transferred in a given time interval.

25. The computer-readable medium of claim 20, wherein said monitoring is performed by measuring an amount of data buffered for packetization.

26. The computer-readable medium of claim 20, wherein said causing the network to provision at least a first guaranteed amount of bandwidth includes causing said network to establish a first network connection for said transfer of data, and wherein said causing said network to provision a second, different amount of guaranteed bandwidth comprises:

(i) dropping the first network connection responsive to the change in the monitored bandwidth usage of said data transfer; and (ii) automatically and substantially immediately establishing a second, higher-speed network connection for said transfer of data.

27. The computer-readable medium of claim 20, wherein said causing the network to provision at least a first guaranteed amount of bandwidth includes causing said network to establish a first network connection for said transfer of data, and wherein said causing said network to provision a second, different amount of guaranteed bandwidth comprises:
  (i) dropping the first network connection responsive to the change in the monitored bandwidth usage of said data transfer; and
  (ii) automatically and substantially immediately establishing a second, lower-speed network connection for said transfer of data.

28. A method for transferring data over a network, comprising:
  (a) creating a network connection at an initial speed;
  (b) monitoring a bandwidth usage through the connection; and
  (c) increasing connection speed, in response to a burst in the monitored bandwidth usage, to provide a desired amount of dataflow through the network connection; and
  (d) decreasing the connection speed, in response to an end of the burst in the monitored bandwidth usage,
  (e) the initial speed being a contracted for switch-virtual-circuit (SVC) service rate and the burst causing the connection speed to increase to a full port speed.

29. A method comprising:
  (a) requesting a network to provision at least a first amount of bandwidth to be provided by said network for transfer of data from a first user to a second user;
  (b) monitoring a bandwidth usage of the data transfer; and
  (c) in response to a change in the monitored bandwidth usage, requesting said network to provision a second, different amount of bandwidth to be provided by said network for said transfer of data from said first user to said second user, to thereby provide a desired amount of dataflow between said first and second users.

30. The method of claim 29 wherein each of said requestings includes buying said first and second amounts of bandwidth from said network at different prices.

31. The method of claim 30 wherein said first and second amounts of bandwidths are guaranteed by said network.

32. The method of claim 29 wherein said first user is charged different amounts per second for transfer of said data in response to said requestings.

* * * * *